(12) United States Patent
Lissotschenko et al.

(10) Patent No.: US 7,548,375 B2
(45) Date of Patent: Jun. 16, 2009

(54) METHOD AND DEVICE FOR INFLUENCING LIGHT

(75) Inventors: Vitalij Lissotschenko, Fröndenberg (DE); Aleksei Mikhailov, Dortmund (DE); Iouri Mikliaev, Cheljabinsk (RU); Maxim Darsht, Dortmund (DE)

(73) Assignee: Limo Patentverwaltung GmbH & Co. KG., Gerstengrund (DE)

( * ) Notice: Subject to any disclaimer, the term of this patent is extended or adjusted under 35 U.S.C. 154(b) by 67 days.

(21) Appl. No.: 11/606,253

(22) Filed: Nov. 29, 2006

(65) Prior Publication Data

US 2007/0127132 A1    Jun. 7, 2007

(30) Foreign Application Priority Data

Dec. 1, 2005    (DE) .................. 10 2005 057 660

(51) Int. Cl.
  *G02B 27/10*    (2006.01)
(52) U.S. Cl. ....................... 359/619; 359/626
(58) Field of Classification Search ................ 359/618, 359/619, 626, 629, 634, 559, 566
See application file for complete search history.

(56) References Cited

U.S. PATENT DOCUMENTS

| | | | |
|---|---|---|---|
| 5,600,666 A | 2/1997 | Hiiro | |
| 5,923,475 A * | 7/1999 | Kurtz et al. | ......... 359/619 |
| 6,084,626 A | 7/2000 | Ramanujan et al. | |
| 6,341,136 B1 | 1/2002 | Hiiro | |
| 6,400,855 B1 | 6/2002 | Li et al. | |

FOREIGN PATENT DOCUMENTS

DE    199 18 391 A1    11/1999

* cited by examiner

*Primary Examiner*—Alicia M Harrington
(74) *Attorney, Agent, or Firm*—Laurence A. Greenberg; Werner H. Stemer; Ralph E. Locher

(57) ABSTRACT

A method and device for influencing light, include a first array of lens systems through which the light to be influenced can at least partially pass. A first phase-modifying array modulates the phases of the light which has passed through the individual lens systems of the first array. A second array of lens systems is provided through which the light phase-modified by the phase modifiers can at least partially pass. The second array of lens systems causes a plurality of local intensity maxima of the light to be created in the propagation direction of the light in the region of the second array of lens systems. A first lens system is disposed between the first array of lens systems and the second array of lens systems and a second lens system is disposed between the first lens system and the second array of lens systems. The first phase-modifying array is disposed between the first and second lens systems.

41 Claims, 15 Drawing Sheets

Fig. 5
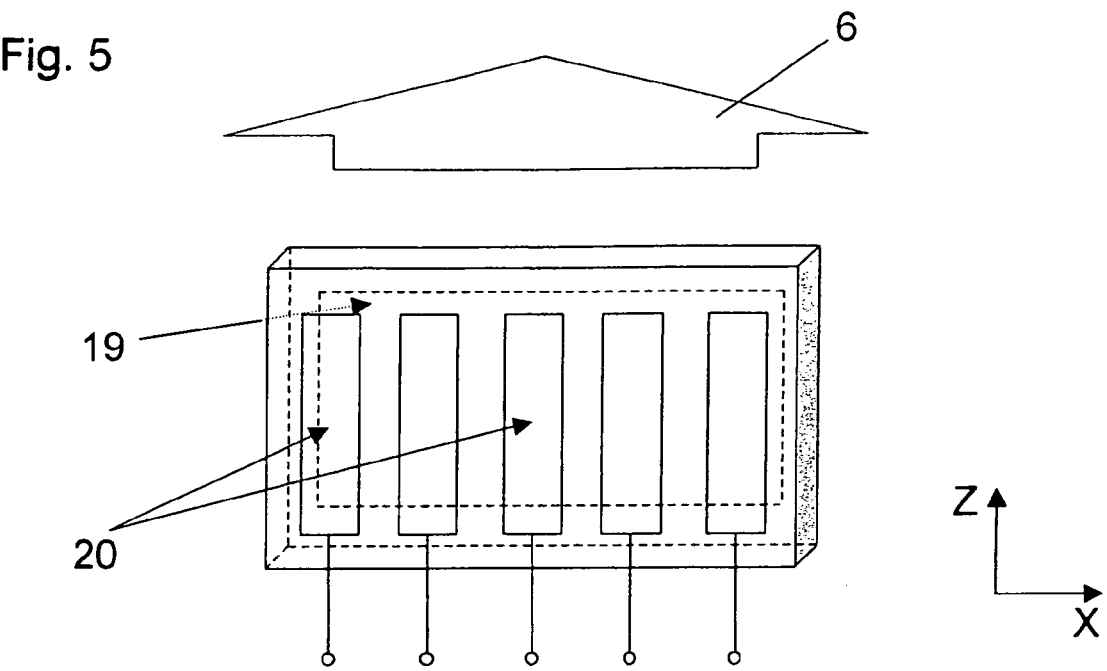
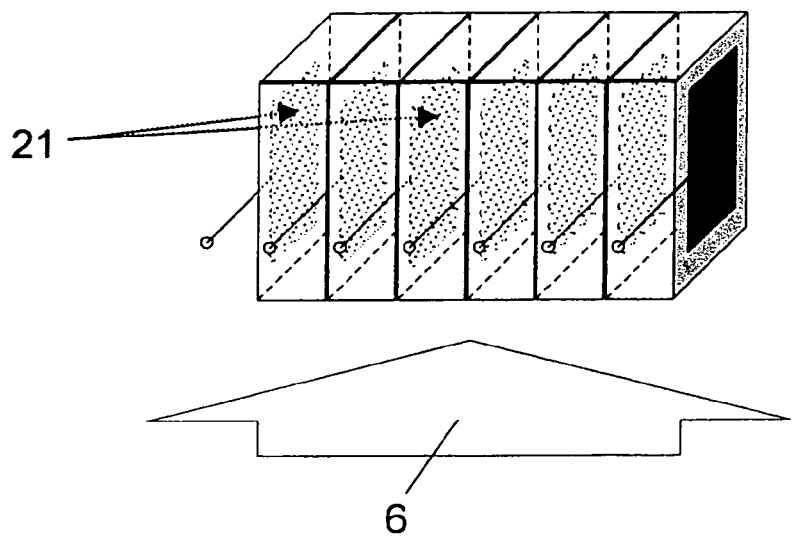
Fig. 6

METHOD AND DEVICE FOR INFLUENCING LIGHT

CROSS-REFERENCE TO RELATED APPLICATION

This application claims the priority, under 35 U.S.C. § 119, of German Patent Application DE 10 2005 057 660.5, filed Dec. 1, 2005; the prior application is herewith incorporated by reference in its entirety.

BACKGROUND OF THE INVENTION

Field of the Invention

The present invention relates to a device for influencing light, including a first array of lens systems, through which the light to be influenced can at least partially pass, a first phase-modifying array, which can modify the phases of the light which has passed through the individual lens systems of the first array of lens systems, and a second array of lens systems, through which the light having passed through the first phase-modifying array can at least partially pass. The second array of lens systems is disposed in the device in such a way that a plurality of local intensity maxima of the light to be influenced can be created before the second array of lens systems in the propagation direction of the light to be influenced or in the region of the second array of lens systems. A first lens system is disposed between the first array of lens systems and the second array of lens systems. The device may be used in the field of laser television, in the field of optical data storage or as a commutator.

The present invention also relates to a method for influencing light, in particular by using a device according to the invention, in which the light passes at least partially through a first array of lens systems, the phases of the light having passed through the individual lens systems of the first array of lens systems are changed at least in subregions, a plurality of local intensity maxima of the light to be influenced are generated before a second array of lens systems in the propagation direction of the light to be influenced, and the light passes at least partially through the lens systems of the second array of lens systems.

The term "in the propagation direction of the light to be influenced" as defined herein is understood to mean the average propagation direction of the light, particularly when it is not a plane wave or when it is at least partially divergent. Unless expressly indicated otherwise, light beam, sub-beam or beam do not mean an idealized ray of geometrical optics but a real light beam, for example a laser beam with a Gaussian profile which has an extended beam cross section rather than one which is infinitesimally small. The term "lens system" as defined herein includes a single lens as well as multiple lenses.

A device of the type mentioned in the introduction is known from U.S. Pat. No. 6,341,136 B1. In the device described therein, the first phase-modifying array is disposed closely after the first array of lens systems, in particular approximately in its output-side focal plane. A second phase-modifying array which is furthermore provided, is disposed shortly before the second array of lens systems, in particular approximately in its input-side focal plane. The first lens system, which is constructed as a biconvex lens, carries out a Fourier transform of the intensity distribution in the plane of the first phase-modifying array into the plane of the second phase-modifying array. Such a device can deviate a light beam very rapidly by a comparatively large angle because, before the second array of lens systems, intensity maxima are created which can be slightly displaced transversely to the lens systems by the phase modification. That displacement leads to a deviation by a large angle due to the close proximity to the lens systems.

A disadvantage of such a device is that it is not possible to use broadband laser light sources, for example semiconductor lasers, because the imaging by the first array of lens systems into the plane of the first phase-modifying array depends on the wavelength of the light being used. In the case of light with significantly different wavelengths, such as in a semiconductor laser, the intensity distribution transformed into the plane of the second phase-modifying array has maxima at different positions for different wavelengths, so that the beam deviation will take place in different directions for different wavelengths.

SUMMARY OF THE INVENTION

It is accordingly an object of the invention to provide a method and a device for influencing light, which overcome the hereinafore-mentioned disadvantages of the heretofore-known methods and devices of this general type and which are more effective. In particular, the method and device according to the invention enable high-resolution beam deviation which can take place very rapidly, for example in the range of $10^{-10}$ s. This leads to versatile applications, for example in the fields of optical data storage and laser television.

With the foregoing and other objects in view there is provided, in accordance with the invention, a device for influencing light. The device comprises a first array of individual lens systems, through which the light to be influenced can at least partially pass. A first phase-modifying array is provided for modifying phases of the light having passed through the individual lens systems of the first array of lens systems. A second array of lens systems is provided, through which the light having passed through the first phase-modifying array can at least partially pass. The second array of lens systems causes a plurality of local intensity maxima of the light to be influenced to be created in a vicinity of or before the second array of lens systems in a propagation direction of the light to be influenced. A first lens system is disposed between the first array of lens systems and the second array of lens systems. The first phase-modifying array is disposed after (downstream) the first lens system in the propagation direction of the light to be influenced.

In accordance with another feature of the invention, it is possible for the device to include a second lens system, which is disposed between the first lens system and the second array of lens systems, with the first phase-modifying array being disposed between the first lens system and the second lens system. In particular, the first and second lens systems may carry out a double Fourier transform of the light to be influenced. In this case, the first phase-modifying array may be disposed approximately in the region of the output-side Fourier plane of the first lens system and in the region of the input-side Fourier plane of the second lens system. This also makes it possible to use laser light sources with a sizeable bandwidth, for example semiconductor lasers.

In accordance with a further feature of the invention, the device may be used in the field of laser television, in the field of optical data storage or as a commutator.

With the objects of the invention in view, there is also provided a method for influencing light, in particular by using a device according to the invention. The method comprises passing the light at least partially through a first array of lens systems, passing the light through a first lens system which Fourier transforms the light, after passing through the first array of lens systems, changing phases, at least in subregions, of the light having passed through individual lens systems of the first array of lens systems and having been Fourier-transformed, generating a plurality of local intensity maxima of the light to be influenced before a second array of lens systems in a propagation direction of the light to be influenced, and passing the light at least partially through the lens systems of the second array of lens systems.

Other features which are considered as characteristic for the invention are set forth in the appended claims.

Although the invention is illustrated and described herein as embodied in a method and a device for influencing light, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 is an elevational view according to FIG. 2 with a first phase-modifying array switched on;

FIG. 4 is an elevational view according to FIG. 2 with the first and second arrays of phase modifiers switched on;

FIG. 5 is a perspective view of a first embodiment of a phase-modifying array;

FIG. 6 is a perspective view of a second embodiment of a phase-modifying array;

DESCRIPTION OF THE PREFERRED EMBODIMENTS

Figure 1:
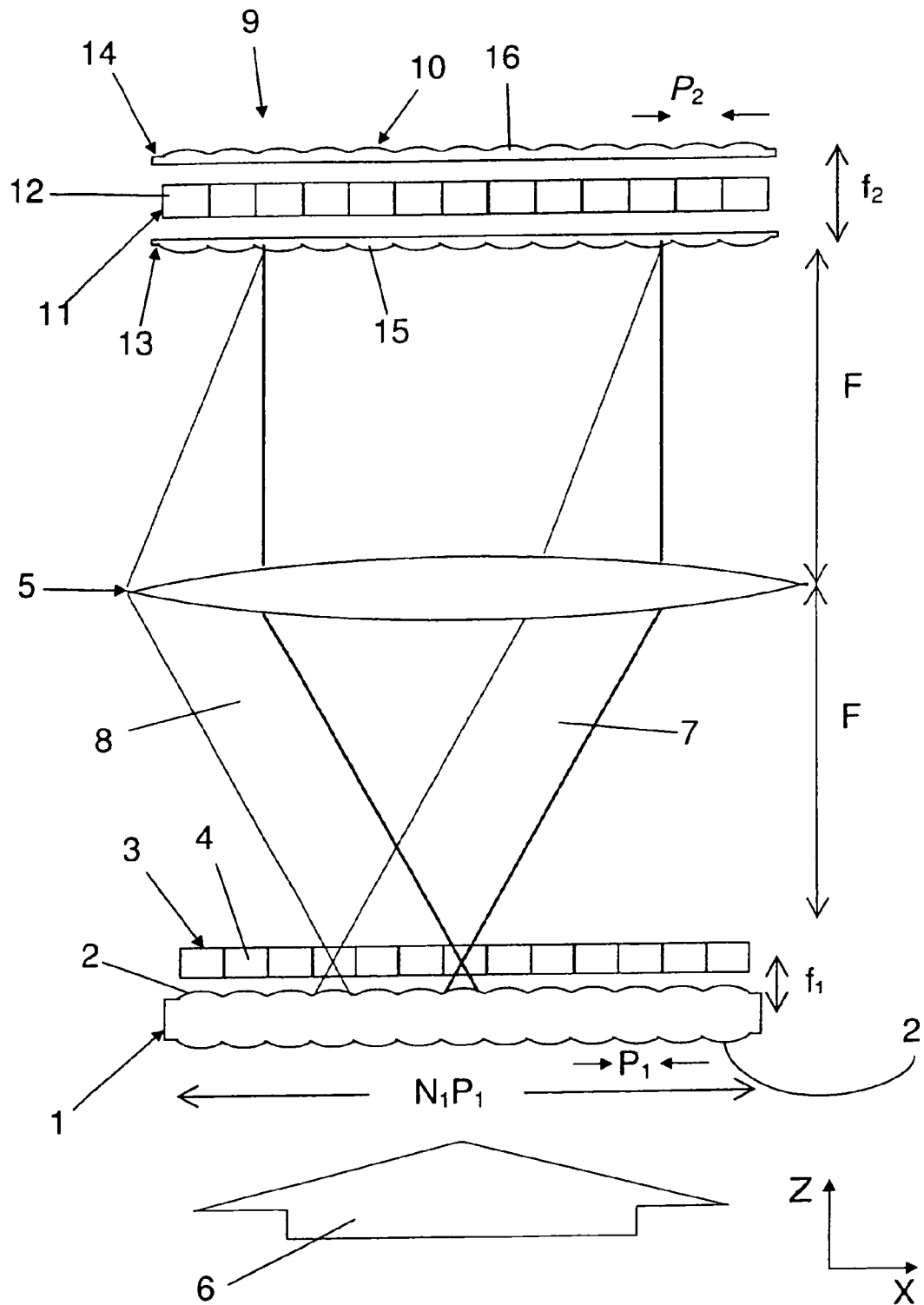
FIG. 1 is a diagrammatic, elevational view of a device for influencing light.

Referring now in detail to the figures of the drawings, in many of which a Cartesian coordinate system is indicated for better orientation, and first, particularly, to FIGS. 1 to 4 thereof, there is seen an embodiment of a device for influencing light, which includes a first array 1 of lens systems 2. These lens systems 2 may be cylinder lenses disposed next to one another in the X direction, with cylinder axes aligned in the Y direction. The cylinder lenses may be constructed as biconvex or planoconvex lenses. It is furthermore possible to provide two substrates, on which planoconvex cylinder lenses respectively corresponding to one another are disposed. It is possible to use spherical lenses instead of cylinder lenses.

The embodiment of a device according to the invention as depicted in FIG. 1 to FIG. 4 furthermore includes a first array 3 of phase modifiers 4. The phase modifiers 4 are disposed next to one another in the X direction. In the illustrated exemplary embodiment, the number of phase modifiers 4 corresponds to the number of lens systems 2. The phase modifiers 4 are disposed in the region of the output-side focal plane of the lens systems 2, so that one of the lens systems 2 respectively lies flush with one of the phase modifiers 4 in a propagation direction Z of the light. A width of each of the lens systems 2 or each of the phase modifiers 4 in the X direction is indicated by reference symbol $P_1$ in FIG. 1 (pitch). A width of the first array 1 of lens systems 2 in the X direction is therefore equal to $N_1 \cdot P_1$, where $N_1$, is the number of lens systems 2.

The phase modifiers 4 may, for example, be constructed as electro-optical modifiers, acousto-optical modifiers or liquid crystal modifiers.

A first lens system 5, serving as a Fourier transform element, is disposed after the first array 3 of phase modifiers 4 in the propagation direction Z of the light. This first lens system 5 is constructed as a biconvex lens in the illustrated exemplary embodiment. A distance between the focal plane of the lens systems 2 of the first array 1 and the first lens system 5 serving as a Fourier transform element corresponds to a focal length F of the lens systems 5. A spacing between the first array 1 of lens systems 2 and the first lens system 5 is therefore $F+f_1$, where $f_1$, is the focal length of the lens systems 2 of the first array 1.

The light incident on the device in the Z direction is provided with reference numeral 6. This light may, for example, be formed as a plane wave, which propagates exactly in the Z direction. It is, however, also possible for one or more waves from different directions to strike the first array 1 of lens systems 2.

After passing through the first array 1 of lens systems 2, the light 6 is split in its focal plane into a multiplicity of sub-beams spaced apart from one another in the X direction, which have beam waists or narrowed regions with an extent in the X direction that is less than the width of the individual phase modifiers 4. This ensures that the sub-beams pass through the phase modifiers 4. In the output-side (in the Z direction) focal plane of the first lens system 5 serving as a Fourier transform element, a multiplicity of local intensity maxima of the light 6 to be influenced are created so as to be spaced apart from one another in the X direction. Two sub-beams 7, 8 with corresponding intensity maxima in the output-side focal plane of the first lens system 5 are indicated in FIG. 1.

The embodiment of the device depicted in FIG. 1 to FIG. 4 furthermore includes a second array 9 of lens systems 10 as well as a second array 11 of phase modifiers 12. In this case, the second array 9 of lens systems 10 is configured in two stages with two substrates 13, 14, on which lens elements 15, 16 are respectively formed as planoconvex cylinder lenses. It is likewise possible to construct the lens elements 15, 16 as biconvex or concave-convex cylinder lenses. In this case, the spacing of the lens elements 15, 16 in the Z direction on different substrates 13, 14 may correspond to a focal length $f_2$ of those on the second substrate 14 in the propagation direction Z of the light. The second array 9 of lens systems 10 may also include only one substrate, in which case the cylinder lenses may be constructed as biconvex or planoconvex lenses or concave-convex lenses.

In the exemplary embodiment according to FIG. 1 to FIG. 4, the two substrates 13, 14 are spaced apart from each other in the Z direction. The second array 11 of phase modifiers 12 is disposed therebetween. It is, however, also possible for the second array 11 of phase modifiers 12 to be disposed before or after the second array 9 of lens systems 10.

These lens systems 10 may be cylinder lenses disposed next to one another in the X direction, with cylinder axes aligned in the Y direction.

In the illustrated exemplary embodiment, the number of phase modifiers 12 corresponds to the number of lens systems 10. The phase modifiers 12 are disposed in such a way that one of the lens systems 10 respectively lies flush with one of the phase modifiers 12 in the propagation direction Z of the light. The width of each of the lens systems 10 or each of the phase modifiers 12 in the X direction is provided with reference symbol $P_2$ in FIG. 1. The width of the second array 9 of lens systems 10 in the X direction is therefore equal to $N_2 \cdot P_2$, where $N_2$ is the number of lens systems 10 of the second array 9.

The intensity maxima of the light having passed through the first lens system 5 serving as a Fourier transform element occur shortly before the second array 9 of lens systems 10 in the Z direction. The spacing between the maxima and the second array 9 may correspond approximately to the focal length of the lens elements 15 on the first substrate 13, or may be a little less or more than that.

Figure 2:
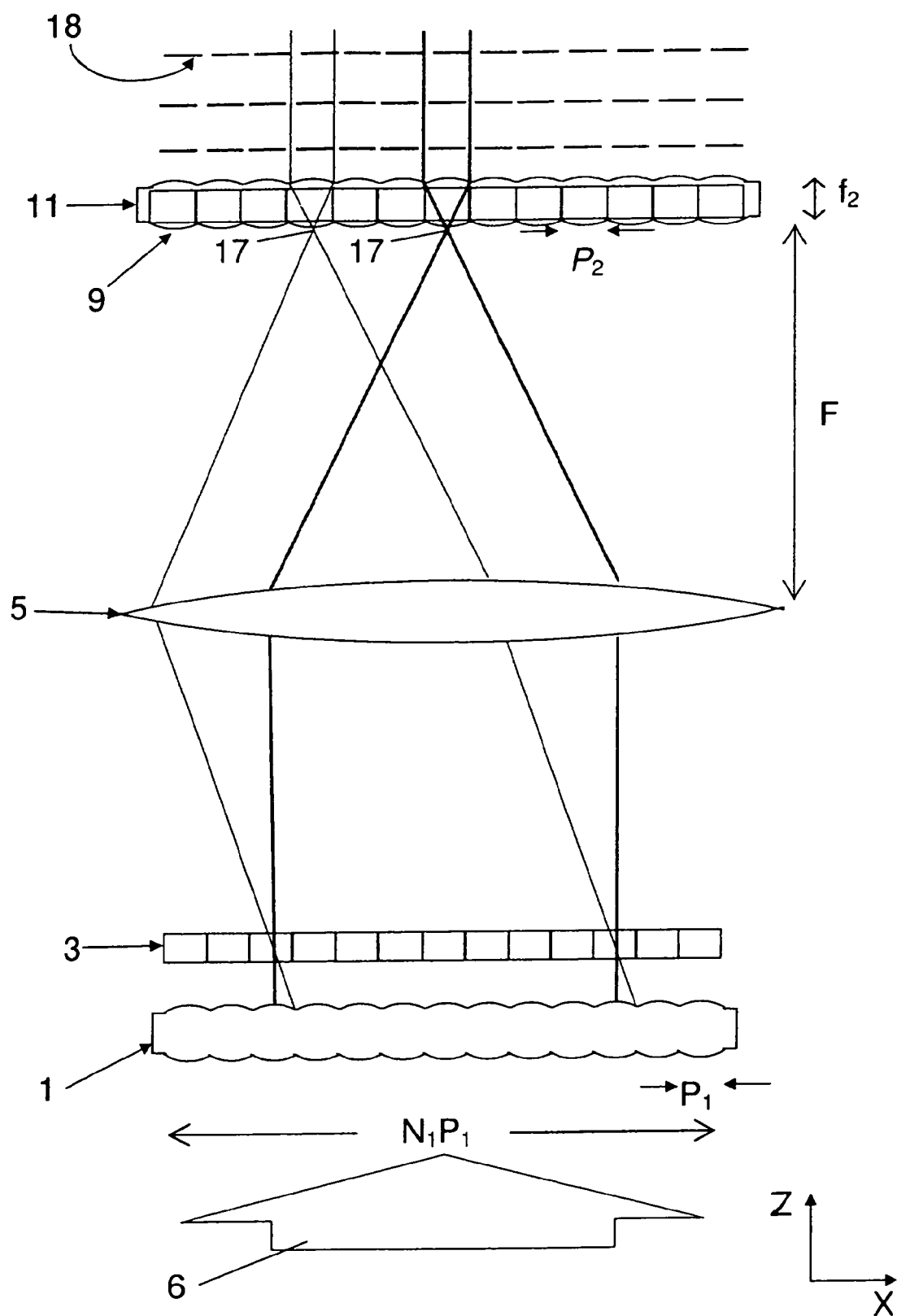
FIG. 2 is an elevational view of the device according to FIG. 1 with diagrammatically indicated wavefronts of light leaving the device.
Figure 3:
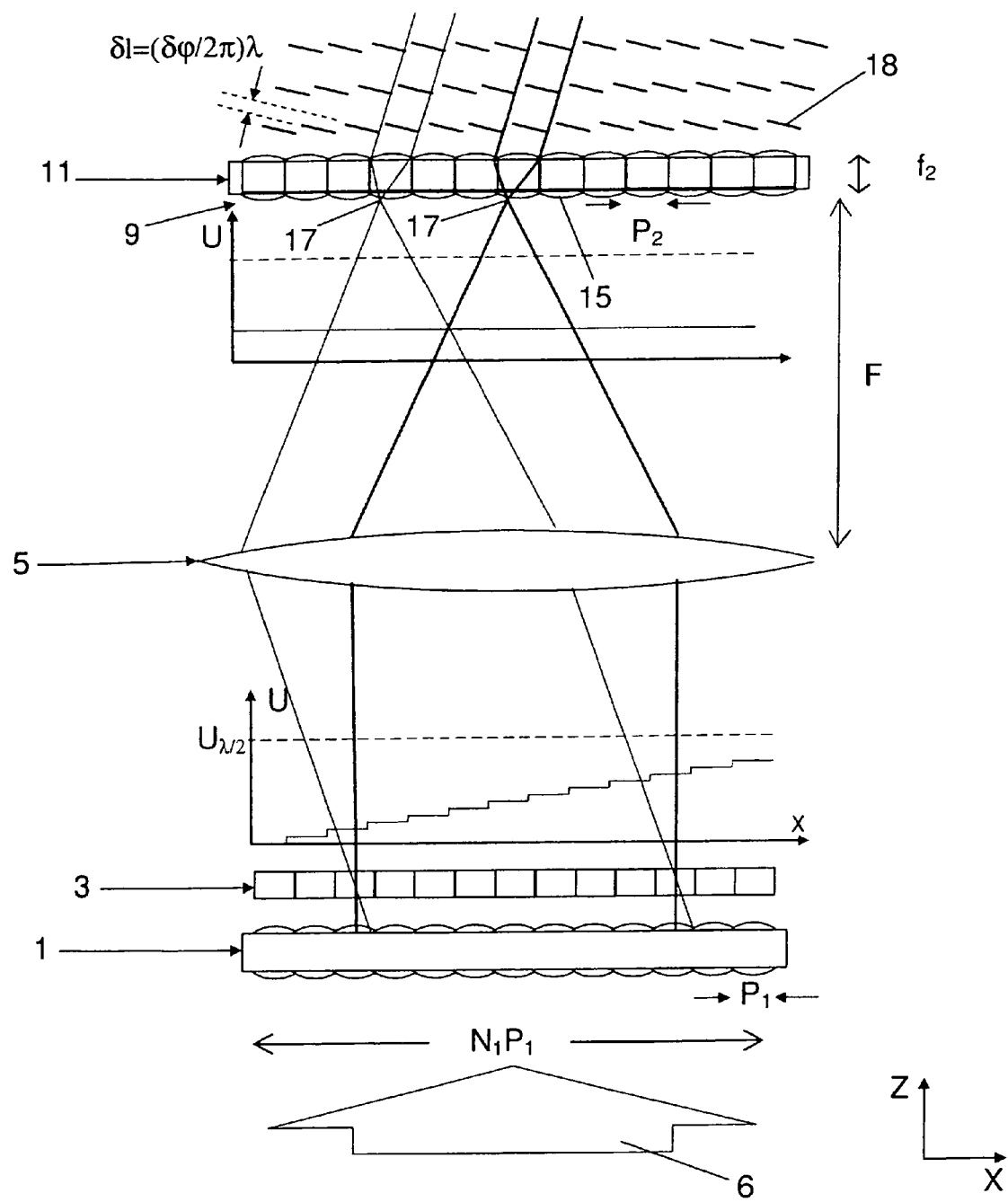
Figure 4:
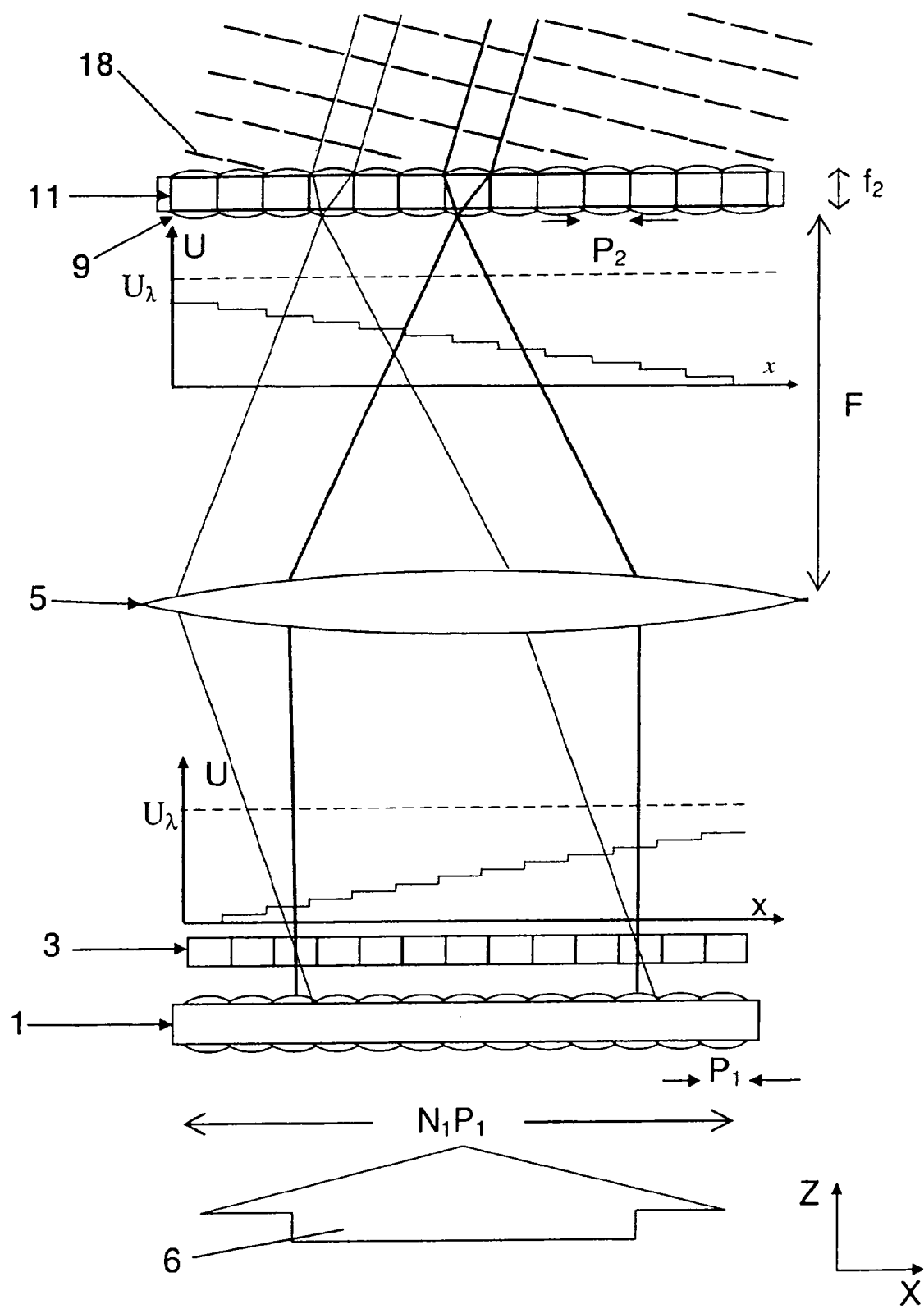

In FIG. 2 to FIG. 4, parts which are the same as in FIG. 1 are provided with the same reference symbols. It can be seen from FIG. 2 that in the case of a plane wave propagating in the Z direction as incident light 6 and with unactivated first and second arrays 3, 11 of phase modifiers 4, 12, local intensity maxima 17 are disposed flush in front of apices of the lens elements 15, 16 of the lens systems 10 of the second array 9 of lens systems 10 in the propagation direction Z, so that the light leaves the second array 9 in the Z direction as a plane wave having diagrammatically indicated wavefronts 18 that are parallel to the X direction. Since the phase modifiers 4, 12 are not activated, the light is not deviated in the far field and continues to propagate in the positive Z direction.

In FIG. 3, the first phase modifiers 4 are constructed as electro-optical modifiers and are activated. A voltage U, which is applied to the electro-optical modifiers, is indicated by way of example after the phase modifiers 4 in FIG. 3. It is shown that the modifier disposed at the outermost left-hand edge in FIG. 3 does not receive a voltage, while the modifier disposed at the outermost right-hand edge receives a comparatively large voltage. The modifiers disposed between these two edges receive a voltage increasing stepwise from left to right.

A voltage $U_{\lambda/2}$, which corresponds to a phase modification of the light passing through the modifier by half the wavelength $\lambda$ of the light, is furthermore indicated in FIG. 3. It is shown that the voltages applied to the phase modifiers 4, which are constructed as modifiers, are less than $U_{\lambda/2}$, so that the phase modifications caused by the phase modifiers 4 are less than $\lambda/2$.

Due to interference effects, the voltages applied to the phase modifiers 4 cause the light to emerge from the array 3 at an angle to the Z direction. Accordingly, after imaging by the first lens system 5, intensity maxima 17 are shifted to the left relative to the state depicted in FIG. 2, so that they no longer lie flush with the apices of the lens elements 15. Due to the small size of the lens systems 10 of the second array 9, or due to their short focal length, this relatively small displacement causes a comparatively large angle $\phi$ between the light emerging from the second array 9 of lens systems 10 and the Z direction. However, mutually neighboring parts of the wavefront of the emerging light have a phase difference $\delta l = (\delta \phi / 2\pi) \lambda$ (see FIG. 3). The effect of this phase difference $\delta l$ is that the light can emerge from the second array 9 of lens systems 10 only in particular directions, for which there is constructive interference between the individual parts of the light. This situation is approximately similar to that at the output of a grating.

In the state depicted in FIG. 4, the second array 11 of phase modifiers 12 is activated as well. In this case, the highest voltage U is applied at the right-hand edge and the lowest voltage at the left-hand edge. The effect of the phase shift induced thereby is that neighboring parts of the wavefront of the emerging light have the same phase, so that the emerging light can be deviated in arbitrary directions.

Figure 7:
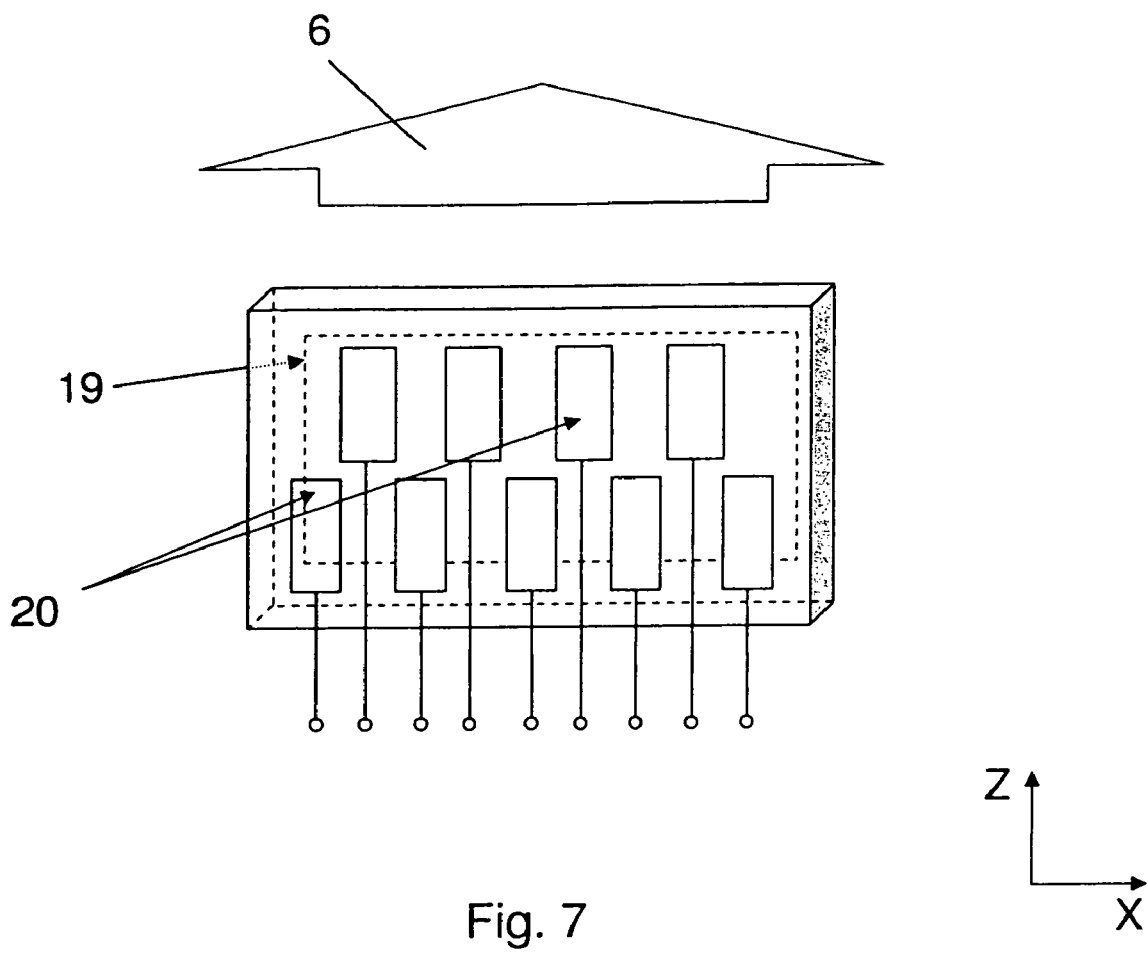
FIG. 7 is a perspective view of a third embodiment of a phase-modifying array.

FIG. 5 to FIG. 7 show exemplary embodiments of the arrays 3, 11 of the phase modifiers 4, 12, which are configured as electro-optical modifiers. In the embodiment according to FIG. 5, a common electrode 19 is disposed on the side of the modifier which lies at the rear in FIG. 5, while a multiplicity of individual electrodes 20 are disposed on the front side. An electric field is set up therebetween in the Y direction.

In the embodiment according to FIG. 6, electrodes 21 are each respectively provided on outer (in the X direction) faces and between two neighboring modifier elements. The electric field is set up between these electrodes in the X direction.

The embodiment according to FIG. 7 corresponds to that according to FIG. 5, except for the fact that the electrodes 20 are disposed mutually offset in the Z direction.

Figure 14:
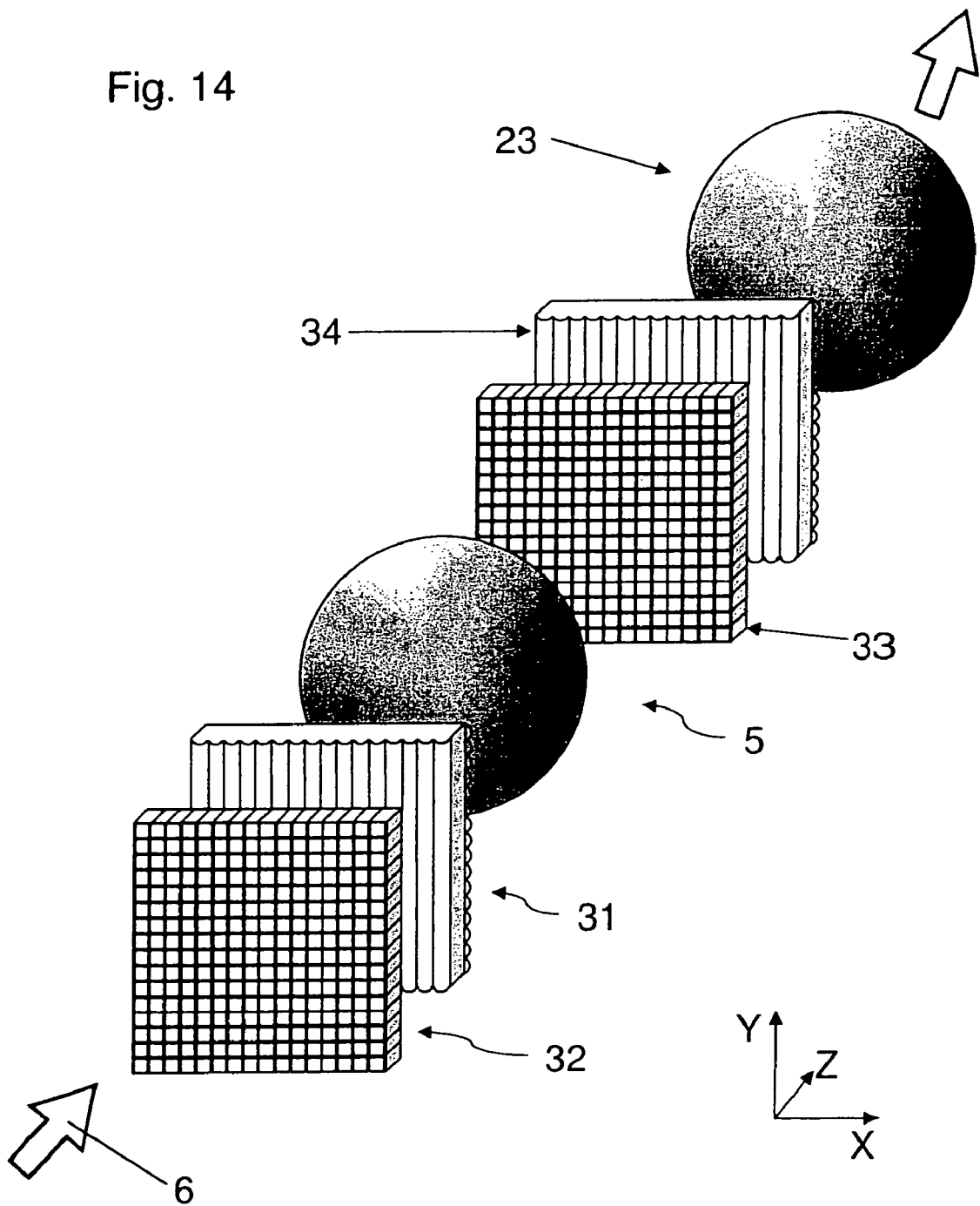
FIG. 14 is an exploded, perspective view of a further embodiment of a device for influencing light.
Figure 15:
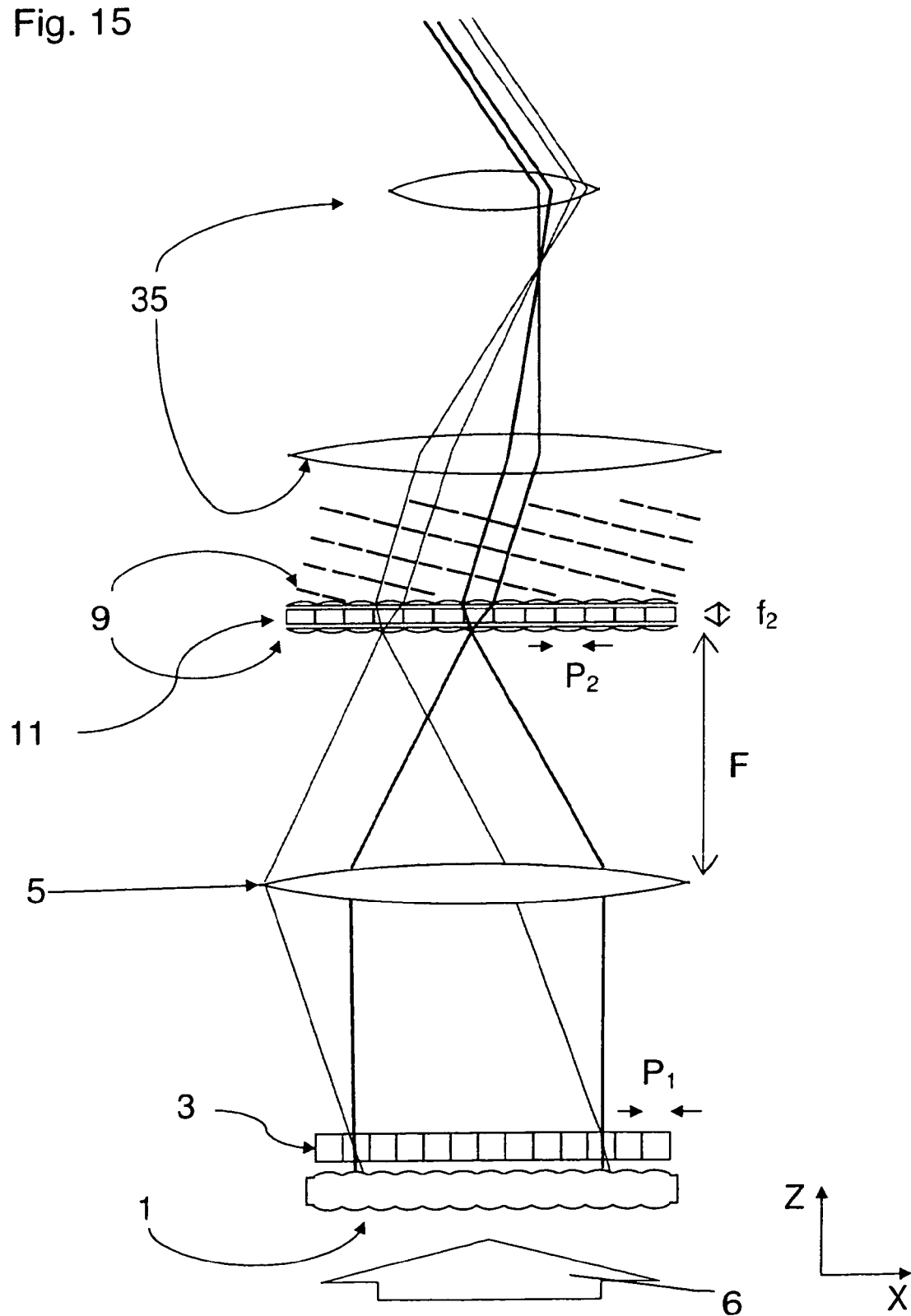
FIG. 15 is an elevational view of a further embodiment of a device for influencing light.
Figure 16:
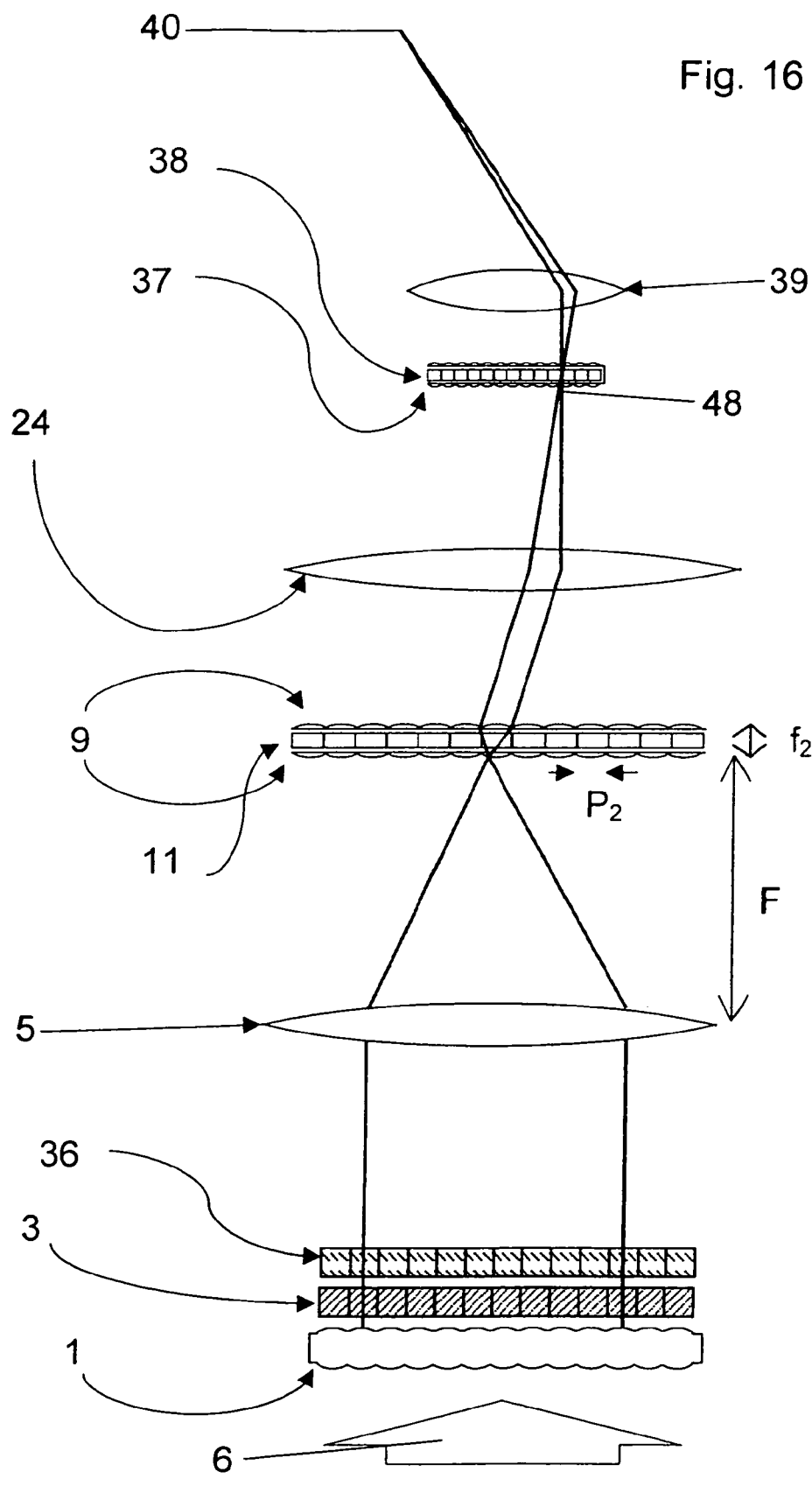
FIG. 16 is an elevational view of a further embodiment of a device for influencing light.

In FIG. 8 to FIG. 12 and in FIG. 14 to FIG. 16, parts which are the same as in FIG. 1 to FIG. 4 are provided with the same reference symbols. In this case, the parts provided with the same reference symbols may be disposed in the same or a similar way in the device and fulfill an identical or similar function as in FIG. 1 to FIG. 4.

Figure 8:
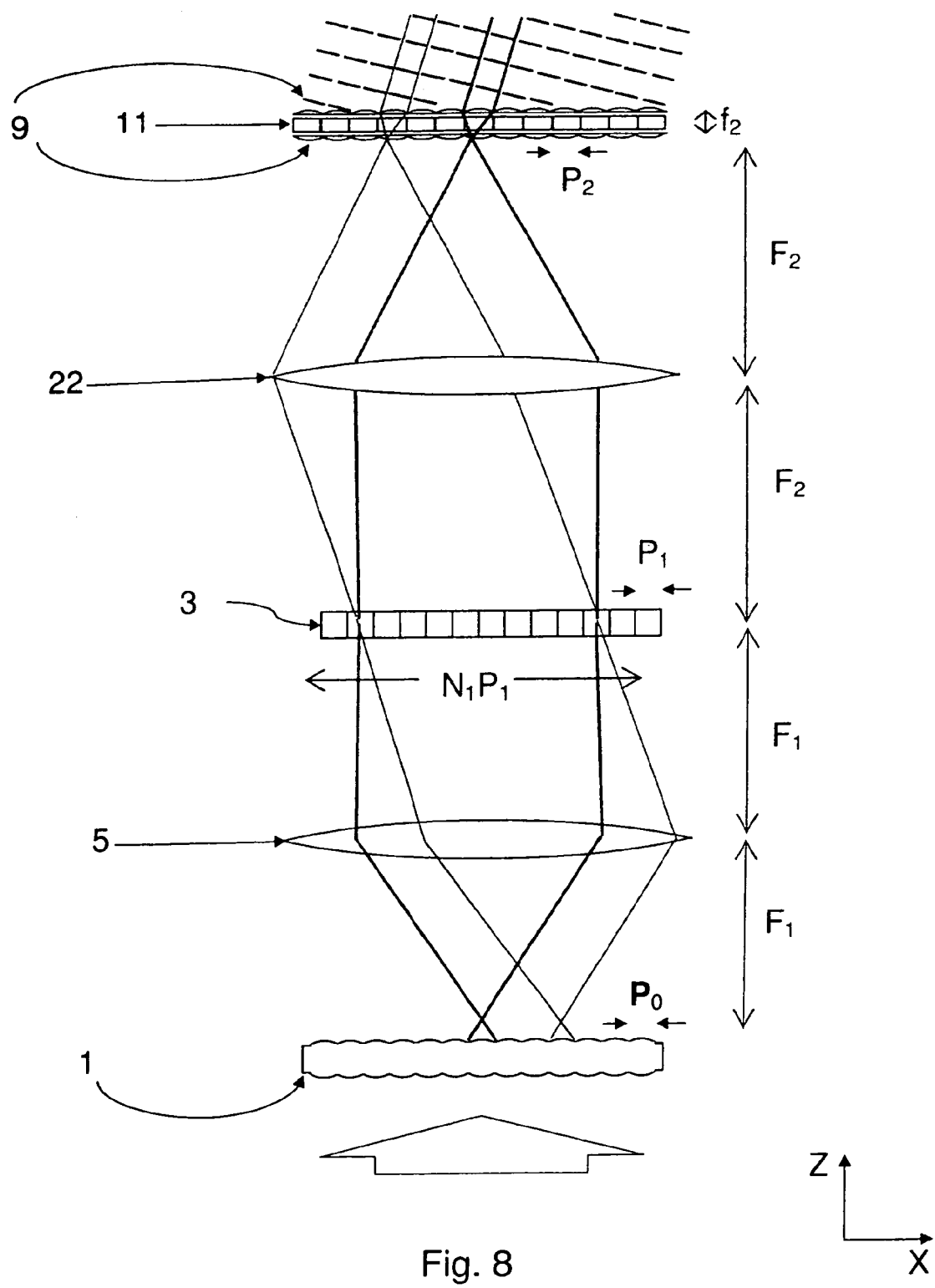
FIG. 8 is an elevational view of a first embodiment of the device according to the invention with diagrammatically indicated wavefronts of the light leaving the device.

In the embodiment of the device according to FIG. 8, the first array 3 of phase modifiers 4 is disposed not in the region of the first array 1 of lens systems 2, but in the output-side focal plane of the first lens system 5 serving as a Fourier transform element. The device includes a second lens system 22 serving as a Fourier transform element, which is disposed at the same spacing from the second array 9 of lens systems 10 as the first lens system 5, in the embodiment according to FIGS. 1 to 4. The first array 3 of phase modifiers 4 is disposed in the input-side focal plane of the second lens system 22.

The input-side focal plane of the first lens system 5 coincides with the output-side focal plane of the first array 1 of lens systems 2. The corresponding focal length of the first lens system 5 in FIG. 8, which is configured, for example, as a biconvex lens, is denoted by reference symbol $F_1$. The output-side focal plane of the first lens system 5 coincides with the input-side focal plane of the second lens system 22. The corresponding focal length of the second lens system 22 in FIG. 8, which is configured, for example, as a biconvex lens, is denoted by reference symbol $F_2$. In this case, the focal lengths $F_1$ and $F_2$ may be equal to or different than each other.

The two-dimensional intensity distribution of the light to be influenced, as found in the input-side focal plane of the first lens system 5, is Fourier-transformed by the first lens system. The input-side focal plane of the first lens system 5 may also be regarded as an object plane and the intensity distribution in this object plane as an object. The Fourier transform of the input-side intensity distribution is created in the output-side focal plane of the first lens system 5.

This output-side focal plane corresponds to the Fourier plane of the first lens system 5 serving as a Fourier transform element. The spatial intensity distribution in the input-side focal plane of the first lens system 5 is converted by the first lens system 5 into an angle distribution in the Fourier plane. This means that in the Fourier plane, those sub-beams which form the same angle with the Z direction in the input-side focal plane or object plane converge on the same position in the Fourier plane.

The Fourier transform of the object as found in the Fourier plane is Fourier-transformed once more by the second lens system 22, so that the output-side focal plane of the second lens system 22 contains the double Fourier transform of the object and therefore a two-dimensional intensity distribution, which can represent an image of the object. Therefore, the output-side focal plane of the second lens system 22 may also be referred to as an image plane.

The first array 3 of the phase modifiers 4 is positioned exactly in the Fourier plane in the embodiment according to FIG. 8, so that the phase modifiers 4 can exert a direct influence on the phases of the Fourier transform. When the Fourier transform is regarded as an angle distribution, the phase modifiers 4 can modify the angle with respect to the propagation direction Z, at least for individual sub-regions of the Fourier transform. This moreover has a controlled influence on the intensity distribution created in the output-side focal plane of the second lens system 22.

Such a configuration of the first array 3 of the phase modifiers 4 in the Fourier plane makes it possible to use a comparatively broadband laser light source for the light to be influenced, for example a semiconductor laser. The reason for this is that the double Fourier transform by the lens systems 5, 22 and the phase influence in the Fourier plane can ensure comparatively exact positioning of the intensity maxima 17 in front of the second array 9 of lens systems 10, which is independent or is dependent only to an acceptable extent on the wavelength of the light to be influenced.

It is possible to construct the lens system 5 and/or the lens system 22 not as individual biconvex lenses but as a multiplicity of lenses. For example, two lenses which are disposed close together may be used in each case. Such lenses disposed in series can fulfill the same function as the individual lenses with respect to the Fourier transform. At the same time, as is well known, imaging errors can be avoided by doubly configured lenses.

As an alternative or in addition, it is possible to replace each of the biconvex lenses forming the lens system by two identical lenses, the mutual spacing of which is a little less than their focal length. This provides a lens system which can likewise perform a Fourier transform, but which has Fourier planes which lie substantially closer together i.e. directly next to the respective lenses. Such a system will be described in more detail below with reference to FIG. 10.

Figure 9A:
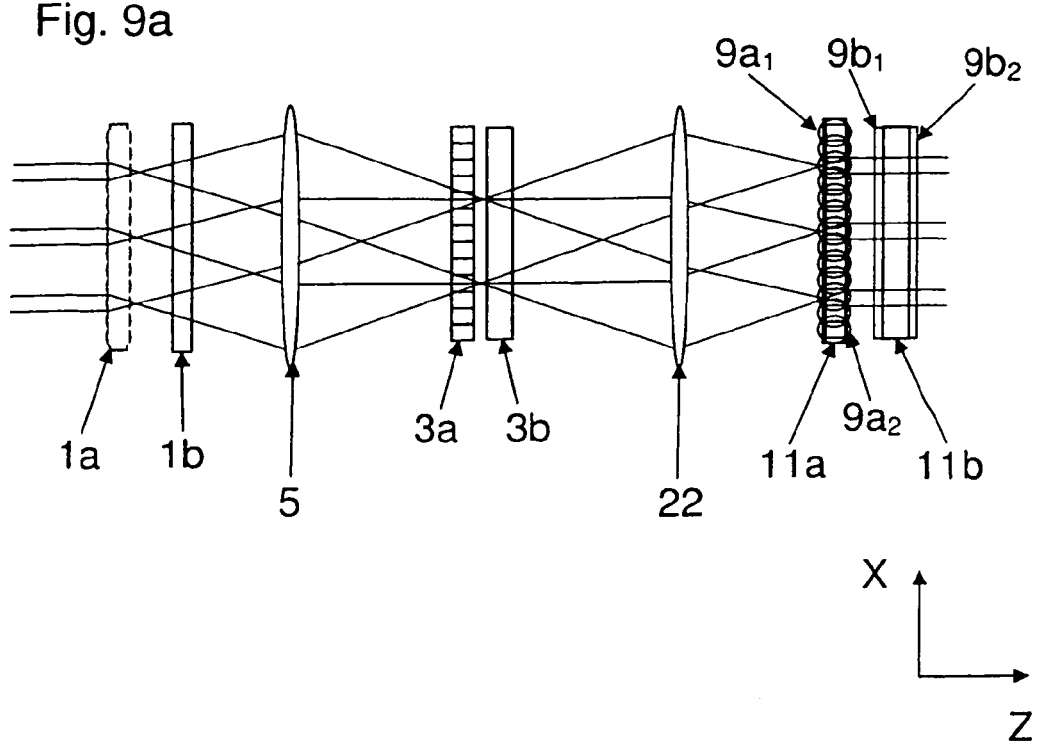
FIG. 9A is an elevational view of a second embodiment of a device according to the invention.
Figure 9B:
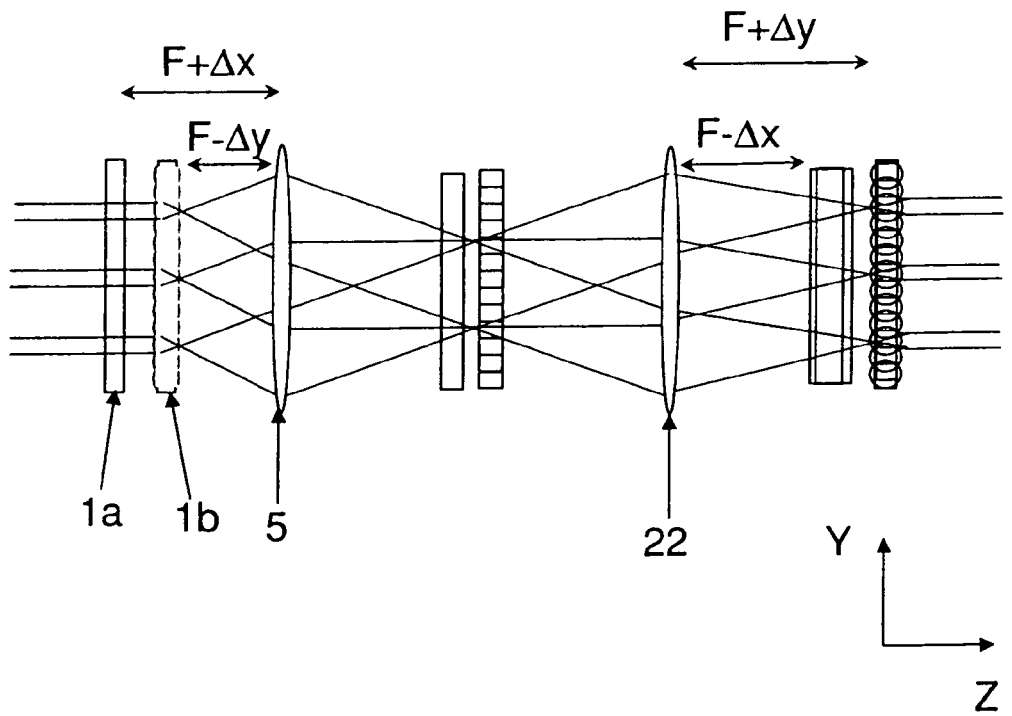
FIG. 9B is an elevational view of the second embodiment according to FIG. 9A rotated by 90°.

The embodiment according to FIG. 9A and FIG. 9B corresponds to the embodiment according to FIG. 8, with respect to the double Fourier transform.

In contrast to the embodiment according to FIG. 8, however, two first arrays 1a, 1b of lens systems are provided in the embodiment according to FIG. 9A and FIG. 9B. The left-hand array 1a of the first arrays 1a, 1b of lens systems in FIG. 9A and FIG. 9B respectively has an array of cylinder lenses on its entry face and on its exit face, the cylinder axes of which extend in the Y direction. The right-hand array 1b of the first arrays 1a, 1b of lens systems in FIG. 9A and FIG. 9B respectively has an array of cylinder lenses on its entry face and on its exit face, the cylinder axes of which extend in the X direction.

Furthermore, four second arrays $9a_1$, $9a_2$, $9b_1$, $9b_2$ of lens systems are provided in the embodiment according to FIG. 9A and FIG. 9B. The left-hand arrays $9a_1$, $9a_2$ of the second arrays $9a_1$, $9a_2$, $9b_1$, $9b_2$ of lens systems in FIG. 9A and FIG. 9B respectively have an array of cylinder lenses on two optically functional faces spaced apart from each other, the cylinder axes of which extend in the Y direction. The right-hand arrays $9b_1$, $9b_2$ of the second arrays $9a_1$, $9a_2$, $9b_1$, $9b_2$ of lens systems in FIG. 9A and FIG. 9B respectively have an array of cylinder lenses on two optically functional faces spaced apart from each other, the cylinder axes of which extend in the X direction.

Furthermore, two first arrays 3a, 3b of the phase modifiers are also provided in the embodiment according to FIG. 9A and FIG. 9B. The phases of the light to be influenced can be modified with respect to the X direction by the left-hand array 3a of the first arrays 3a, 3b of the phase modifiers in FIG. 9A and FIG. 9B. The phases of the light to be influenced can be modified with respect to the Y direction by the right-hand array 3b of the first arrays 3a, 3b of the phase modifiers in FIG. 9A and FIG. 9B.

Furthermore, two second arrays 11a, 11b of the phase modifiers are also provided in the embodiment according to FIG. 9A and FIG. 9B. The phases of the light to be influenced can be modified with respect to the X direction by the left-hand array 11a of the first arrays 11a, 11b of phase modifiers in FIG. 9A and FIG. 9B. The phases of the light to be influenced can be modified with respect to the Y direction by the right-hand array 11b of the first arrays 11a, 11b of phase modifiers in FIG. 9A and FIG. 9B.

A respective one of the second arrays 11a, 11b of the phase modifiers is disposed between the second arrays $9a_1$ and $9a_2$ and between the second arrays $9b_1$ and $9b_2$ of lens systems. This configuration will be explained in more detail in conjunction with the exemplary embodiment according to FIG. 10.

In this case, the configuration of the individual optical components in the embodiment according to FIG. 9A and FIG. 9B is selected in such a way that a double Fourier transform with respect to the X direction and a double Fourier transform with respect to the Y direction can be carried out by the lens systems 5, 22. To this end, the spacing between the first lens system 5 and the first array 1a, 1b of lens systems corresponds not exactly to the focal length F of the lens system 5, but to $F+\Delta x$ for the left-hand array 1a and $F-\Delta y$ for the right-hand array 1b. Furthermore, the spacing between the second lens system 22 and the second arrays $9a_1$, $9a_2$, $9b_1$, $9b_2$ of lens systems corresponds not exactly to the focal length F of the lens system 22, but to $F-\Delta x$ for the array $9a_1$ and F+Δy for the array $9b_1$. In this case, Δx and Δy are less than F, in particular they are small as compared to F.

Figure 10:
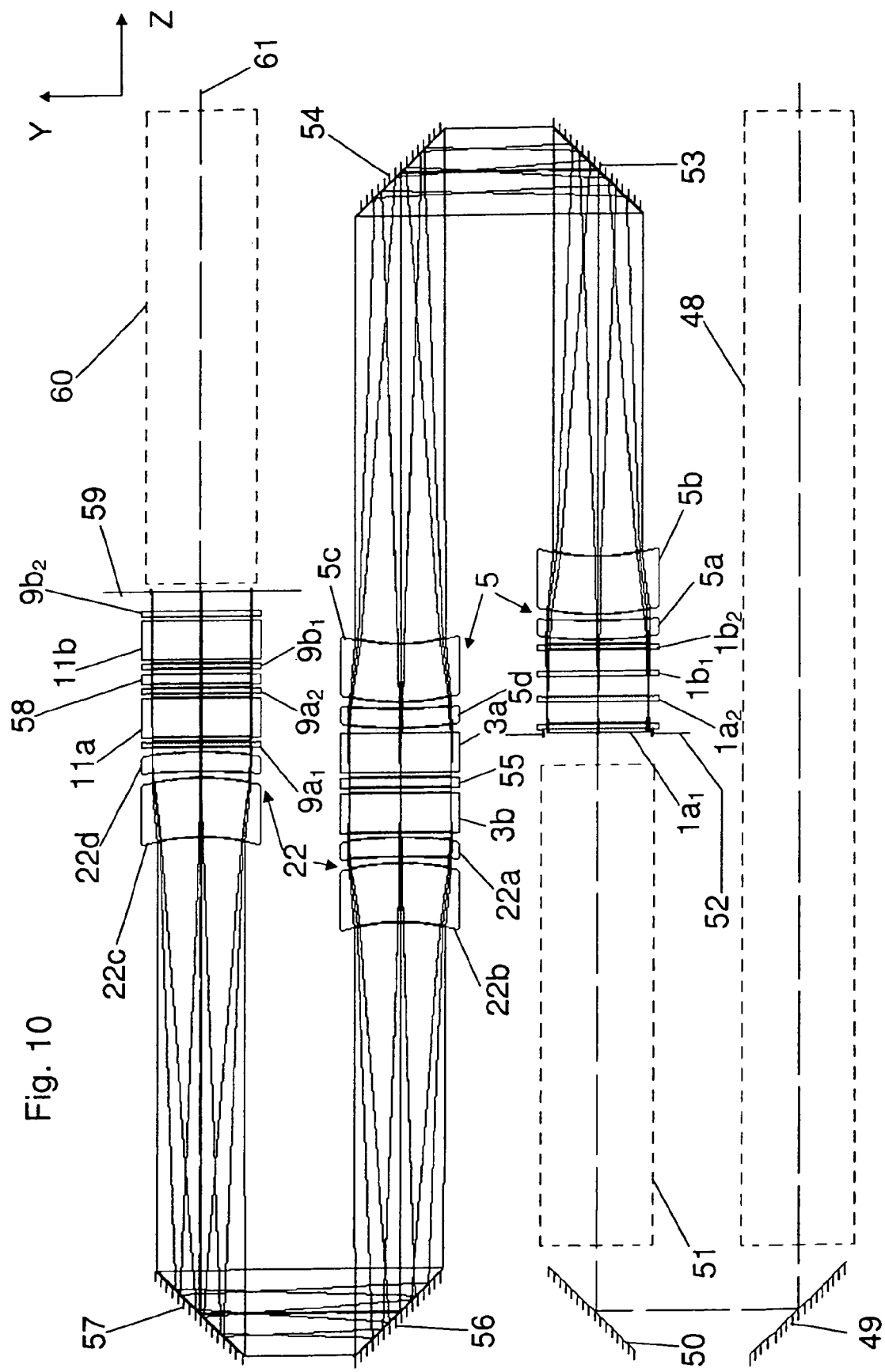
FIG. 10 is an elevational view of a third embodiment of a device according to the invention.

The embodiment according to FIG. 10 corresponds to the embodiments according to FIG. 8 as well as FIG. 9A and FIG. 9B, with respect to the double Fourier transform.

However, in contrast to the embodiments according to FIG. 8 as well as FIG. 9A and FIG. 9B, the lens systems 5 and 22 are configured as a group of lenses in the embodiment according to FIG. 10. In particular, the lens systems 5; 22 respectively have four lenses 5*a*, 5*b*, 5*c*, 5*d*; 22*a*, 22*b*, 22*c*, 22*d*. These lenses 5*a*, 5*b*, 5*c*, 5*d*; 22*a*, 22*b*, 22*c*, 22*d* respectively include pairs of lenses 5*a*, 5*b*; 5*c*, 5*d*; 22*a*, 22*b*; 22*c*, 22*d* disposed next to each other. These pairs reduce imaging errors as compared with individual lenses at the same positions. Preferably, two pairs of lenses are respectively disposed comparatively far apart from each other, i.e. for example the lenses 5*a*, 5*b* are far apart from the lenses 5*c*, 5*d*. The spacing between the pair 5*a*, 5*b* and the pair 5*c*, 5*d* in this case is selected in such a way that the Fourier planes of the lens system 5 are disposed closely outside the lens system 5, 22. This will be explained in more detail below.

A laser 48 is furthermore depicted in FIG. 10. The light coming from this laser is reflected by two mirrors 49, 50 into expanding optics 51. The expanding optics may, for example, expand the laser beam of the laser 48 by a factor of 6. Following the expansion optics 51, the light passes through an aperture diaphragm 52 with a circular opening of 25 mm, for example, into four first arrays ($1a_1$, $1a_2$, $1b_1$, $1b_2$) of lens systems. These arrays ($1a_1$, $1a_2$, $1b_1$, $1b_2$) are constructed similarly to the second arrays $9a_1$, $9a_2$, $9b_1$, $9b_2$ of the embodiment according to FIG. 9A and FIG. 9B. In the embodiment according to FIG. 10, the arrays $1a_1$, and $1a_2$ are provided with a multiplicity of cylinder lenses, the cylinder axes of which extend in the X direction. The arrays $1b_1$, and $1b_2$ following therefrom in the propagation direction of the light include a multiplicity of cylinder lenses, the cylinder axes of which extend in the Y direction.

The input-side Fourier plane of the lens system 5 is disposed approximately in the array $1a_1$. After passing through the lenses 5*a* and 5*b*, the light is reflected by two mirrors 53 and 54 onto the lenses 5*c* and 5*d*. The first of the two first arrays 3*a*, 3*b* of the phase modifiers follows the exit face of the lens system 5*d*. This array 3*a* can modify the phases of the light with respect to the X direction. A λ/2 plate 55, which can rotate the polarization of the light by 90°, is disposed between the first of the two first arrays 3*a*, 3*b* of the phase modifiers and the second of the two first arrays 3*a*, 3*b* of the phase modifiers. This is because the arrays of the phase modifiers may be polarization-dependent. The second array 3*b* of the two first arrays 3*a*, 3*b* of the phase modifiers can modify the phases of the light with respect to the Y direction. The output-side Fourier plane of the lens system 5 is disposed approximately in the λ/2 plate 55.

The input-side Fourier plane of the second lens system 22, which follows the array 3*b* in the propagation direction of the light, is also disposed in the λ/2 plate 55. As with the lens system 5, in the case of the lens system 22, the light is reflected onto the lenses 22*c* and 22*d* by two mirrors 56, 57 after passing through the lenses 22*a*, 22*b*. The lens system 22 is followed by the second arrays $9a_1$, $9a_2$, $9b_1$, $9b_2$ of lens systems and the second arrays 11*a*, 11*b* of the phase modifiers, which are substantially configured as in the embodiment according to FIG. 9A and FIG. 9B. The arrays $9a_1$ and $9a_2$ in this case are provided with a multiplicity of cylinder lenses, the cylinder axes of which extend in the X direction. The arrays $9b_1$ and $9b_2$ following therefrom in the propagation direction of the light include a multiplicity of cylinder lenses, the cylinder axes of which extend in the Y direction. A respective one of the second arrays 11*a*, 11*b* of the phase modifiers is disposed between the second arrays $9a_1$ and $9a_2$ as well as between the second arrays $9b_1$ and $9b_2$ of lens systems. A λ/2 plate 58, which can rotate the polarization of the light by 90°, is furthermore disposed between the arrays $9a_2$ and $9b_1$. The output-side Fourier plane of the lens system 22 is disposed in this λ/2 plate 22.

With respect to the X direction, the double Fourier transform by the lens systems 5, 22 leads to imaging of an object plane, which is disposed in the region of the exit face of the array $1b_2$, into an image plane which is disposed in the region of the exit face of the array $9b_1$. With respect to the Y direction, the double Fourier transform by the lens systems 5, 22 leads to imaging of an object plane, which is disposed in the region of the exit face of the array $1a_2$, into an image plane which is disposed in the region of the exit face of the array $9a_1$.

After passing through a further aperture diaphragm 59, the light enters reduction optics 60 which can reduce the diameter of influenced light 61, for example by a factor of 6. The light beam emerging from the reduction optics 60 can be deviated by the device according to the invention, for example by up to ±10°.

When a larger deviation angle is desired or when a greater resolution is desired, two or more devices may be positioned in series.

Figure 11:
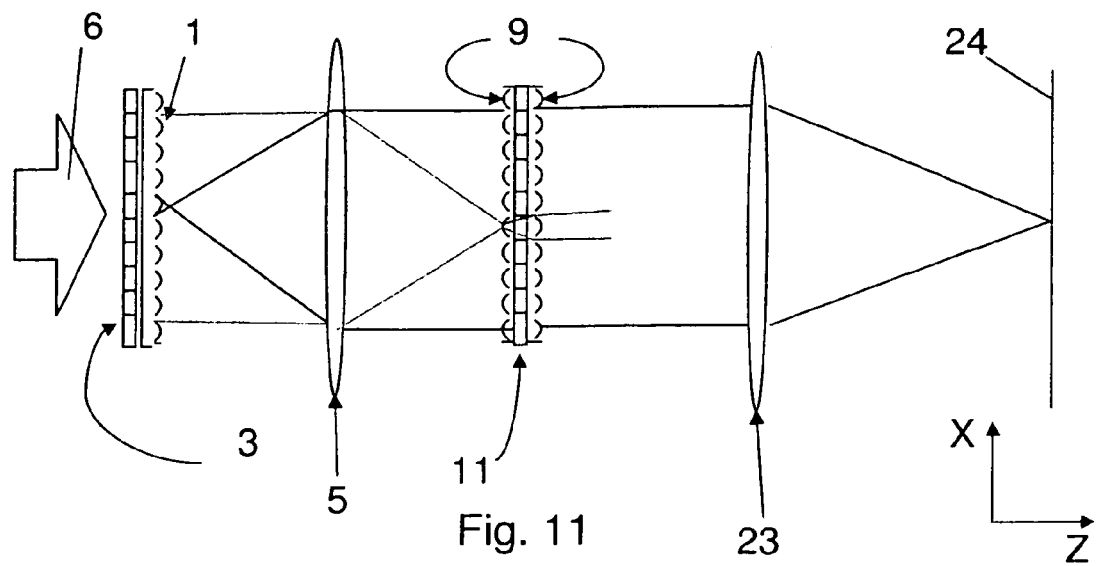
FIG. 11 is an elevational view of a further embodiment of a device for influencing light.

The device according to FIG. 11 includes a further lens system 23, which is disposed after the second array 9 of lens systems 10 and can focus the emerging light into a working plane. A projection surface for a laser television or a storage medium for an optical data memory, for example, may be disposed in this working plane. In this case, the resolution capability of a device according to the invention is given in particular by the product of the numbers $N_1$ and $N_2$ of lens systems 2, 10 in the two arrays 1, 9.

Figure 12:
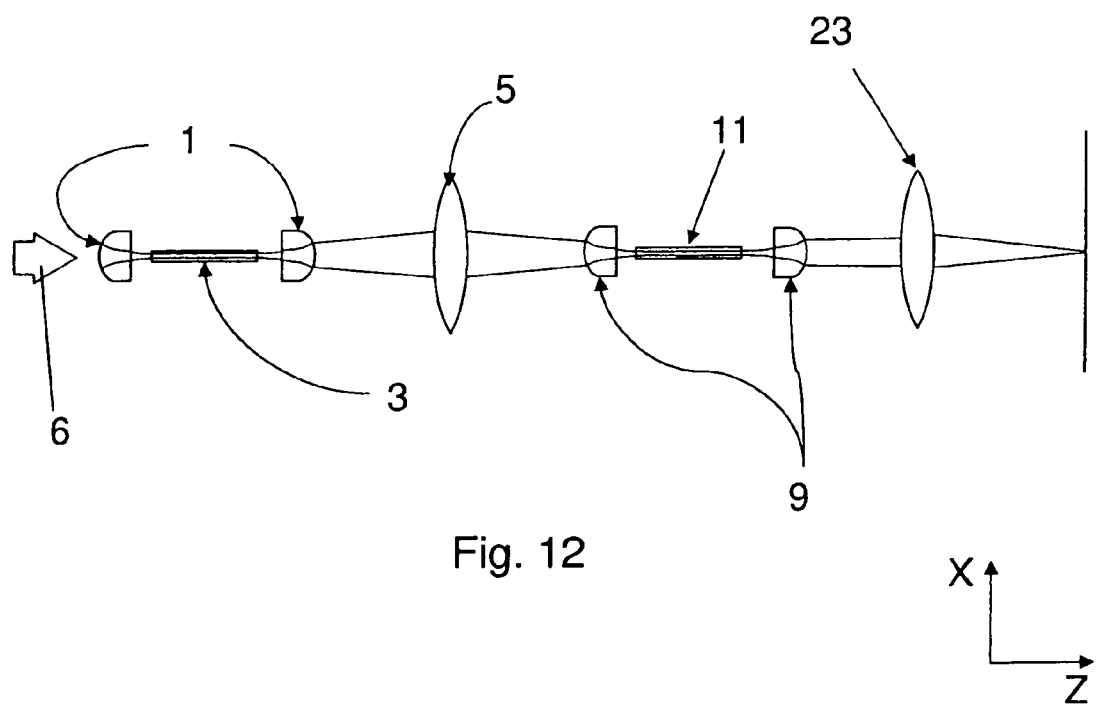
FIG. 12 is an elevational view of a further embodiment of a device for influencing light.

FIG. 12 shows a configuration in which both the first array 1 of lens systems 2 and the second array 9 of lens systems 10 are configured in two stages. In this case, for example, the cylinder axes of the lens elements on a respective first substrate may be aligned perpendicularly to the cylinder axes of the lens elements on a respective second substrate. It is furthermore possible for only a single cylinder lens to be disposed on one of the substrates, with an array of cylinder lenses being disposed on the respective other substrate.

Figure 13:
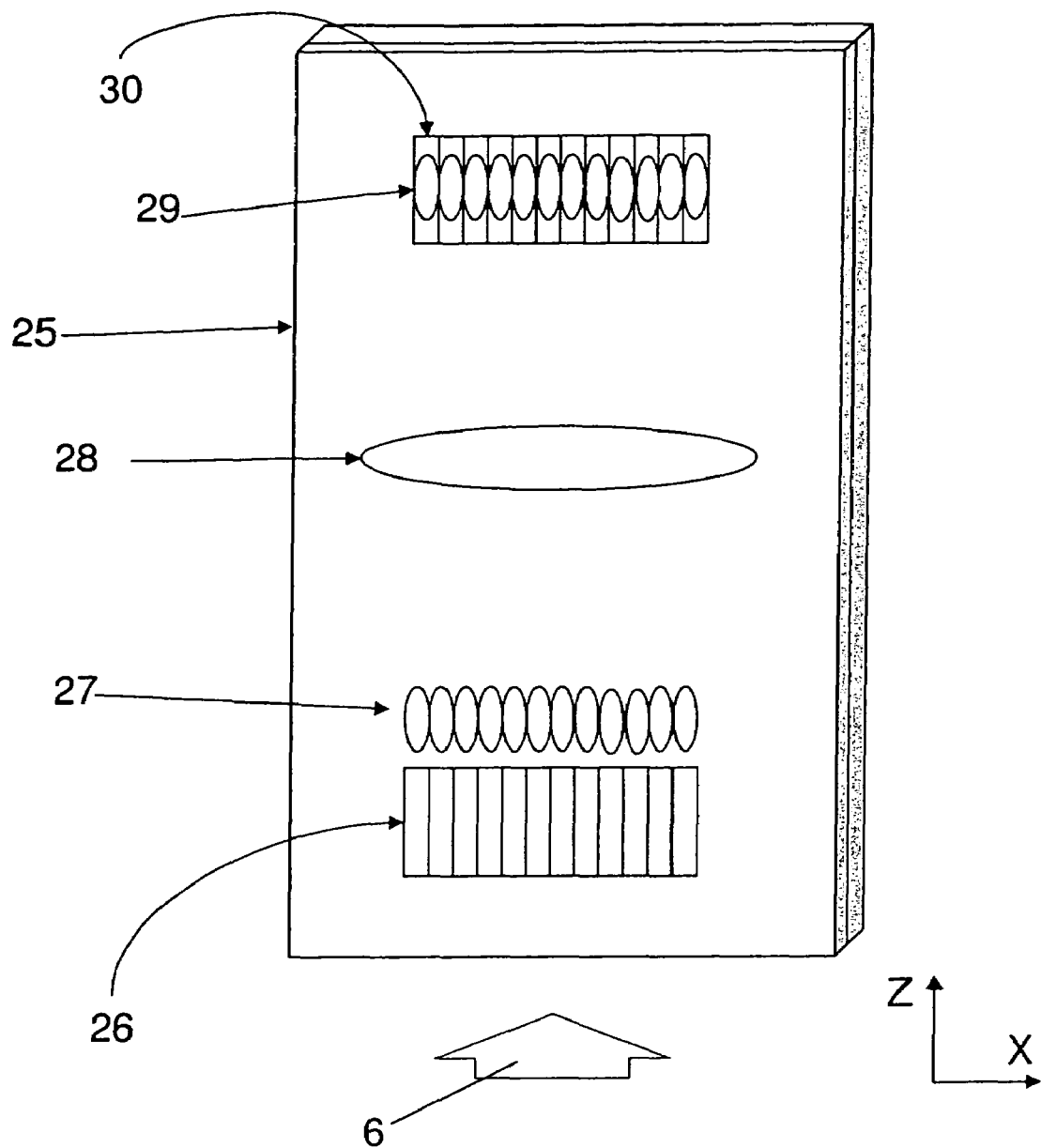
FIG. 13 is a perspective view of a further embodiment of a device for influencing light.

FIG. 13 shows a construction of the device as integrated optics. A first and a second array 26, 30 of phase modifiers are formed, for example as electro-optical modifiers, on a substrate 25 with a waveguide layer. First and second arrays 27, 29 of lens systems include geodesic lens systems as the lens systems. A lens system 28 serving as a Fourier transform element is also constructed as a geodesic lens.

FIG. 14 shows a perspective view of a device with mutually crossed cylinder lenses on first and second arrays 31, 34 of lens systems. In particular, the cylinder axes extend in the Y direction on the respective entry faces of the arrays 31, 34 while the cylinder axes extend in the X direction on the respective exit faces of the arrays 31, 34. Arrays 32, 33 of phase modifiers are constructed as two-dimensional configurations of modifiers.

In contrast to the embodiment according to FIGS. 1 to 4, the embodiment according to FIG. 15 includes a telescope 35 after the second array 9 of lens systems 10, in order to reduce the emerging light beam with respect to its cross section.

Like the device according to FIG. 11, the embodiment according to FIG. 16 includes a further lens system 24 which is disposed after the second array 9 of lens systems 10. In the embodiment according to FIG. 16, in contrast to that according to FIG. 11, a third array 37 of lens systems which may be constructed similarly to the first and/or second array 1, 9 is disposed shortly after the focal plane of this lens system 24. Furthermore, a third array 38 of phase modifiers which may likewise be constructed similarly to the first and/or second array 3, 11 is also disposed in this region. A further array 36 of phase modifiers, which can influence the intensity of the light passing through the individual phase modifiers, may additionally be disposed next to the first array 3 of the phase modifiers. Optionally, a further lens system 39, which can contribute to focusing the emerging light in a focal region 40, is additionally disposed after the third array 37 of lens systems.

The deviation angle or the resolution of the deviation can be increased by the third array 37 of lens systems and the third array 38 of the phase modifiers, as was already explained in conjunction with FIG. 10 for two devices disposed in series. For the sake of simplicity in the following discussion, the first array 1 of lens systems and the first array 3 of the phase modifiers will be referred to as the first stage, the second array 9 of lens systems and the second array 11 of the phase modifiers as the second stage, and the third array 37 of lens systems and the third array 38 of the phase modifiers as the third stage.

For example, the first array 1 of lens systems may include ten lens systems with a numerical aperture NA=0.01 and a pitch of 0.5 mm. The first lens system 5 serving as a Fourier lens may have a focal length of 0.5 m. The second array 9 of lens systems may include ten lens systems with a numerical aperture NA=0.1 and a pitch of 0.5 mm. The second lens system 24 serving as a Fourier lens may have a focal length of 0.05 m. The third array 37 of lens systems may include ten lens systems with a numerical aperture NA=0.1 and a pitch of 0.5 mm.

A light beam entering the first stage, which is formed, for example, as a plane wave with a wavelength of 0.5 μm and a diameter of 5 mm, is split by the first stage into ten plane waves with a propagation difference of 1 mrad. At the output of the second stage, there are ten plane waves with a propagation difference of 10 mrad. It is not until the third stage that the plane waves are recombined, so that a light beam with a diameter of 5 mm and a diffraction-limited divergence of 0.1 mrad emerges at the output of the third stage. The range in which the light beam can be deviated is 100 mrad. The number of propagation directions resolved in this range is 1000. Therefore, due to the additional third stage, on one hand the maximum deviation angle and/or on the other hand the resolution of the deviation, can be increased.

According to the invention, it is also possible to provide more than two stages in order to further increase the deviation angle and/or the resolution.

Furthermore, the demands on the signal-to-noise ratio for the drive signal of the arrays of phase modifiers can also be reduced by increasing the number of stages. In a multistage device, for example, one stage may be replaced by two stages. If the intention is to switch between 100 different deviation angles in one stage, it is necessary to have a signal-to-noise ratio of 100:1. However, if this task is divided between two stages, it is only necessary to switch between ten different deviation angles in each stage so that the required signal-to-noise ratio is reduced to 10:1.

In the embodiment according to FIG. 16, similarly to the embodiments according to FIG. 8, FIG. 9A, FIG. 9B and FIG. 10, it is also possible, for example, to place at least two lens systems serving as Fourier transform elements between the individual arrays of lens systems in the first and/or second and/or third stage, in which case at least one phase-modifying array may be respectively disposed in the region of the common Fourier plane of these lens systems. This configuration of the lens systems serving as Fourier transform elements, as can be seen in FIG. 8, FIG. 9A, FIG. 9B and FIG. 10, is also possible with more than three stages.

In the device according to FIG. 16, the mutual spacing of intensity maxima 62 in front of the third array 37 of lens systems can be modified. In this way, the spacing of the focal region 40 from the device can be modified. This, for example, can permit optical data storage in 3D or a three-dimensional laser television.

It is possible for two devices according to the invention, for example as in FIG. 8, to be disposed in series, with the second being rotated by 90° relative to the first. This can permit influencing or deviation of the light 6 first in the X direction and then in the Y direction.

Instead of one plane wave, furthermore possible for a multiplicity of plane waves from different directions to enter a device according to the invention and for them to be influenced independently of one another.

Figure 17:
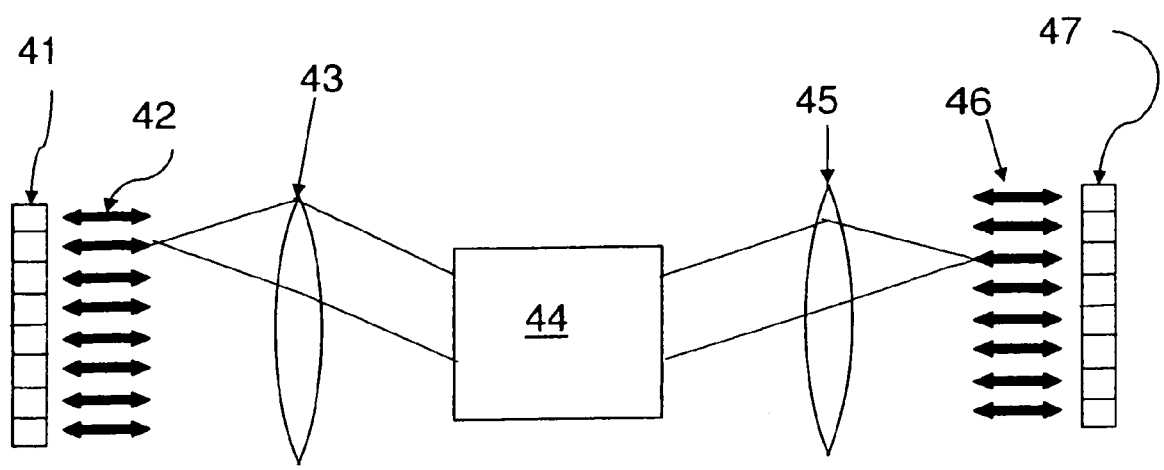
FIG. 17 is an elevational view of a configuration for connecting two light guides.

FIG. 17 shows an application as a bidirectional commutator or as a bidirectional connector between two multichannel optical data lines. Reference numerals 41 and 47 denote electro-optical modifiers or Pockels cells for influencing the intensity of individual channels 42, 46. A suitable embodiment of a device according to the invention is denoted by reference numeral 44. The injection of the light into the device 44, or into the individual channels 42, 46, is carried out by lens systems 43, 45.

We claim:

1. A device for influencing light, the device comprising:
a first array of lens systems, through which the light to be influenced can at least partially pass;
a first phase-modifying array for modifying phases of the light having passed through said lens systems of said first array of lens systems;
a second array of lens systems, through which the light having passed through said first phase-modifying array can at least partially pass, said second array of lens systems being disposed in the device so that a plurality of local intensity maxima of the light to be influenced can be created in a vicinity of or before said second array of lens systems in a propagation direction of the light to be influenced;
a first lens system disposed between said first array of lens systems and said second array of lens systems, said first lens system being configured to Fourier transform the light to be influenced; and
a second lens system disposed between said first lens system and said second array of lens systems, said second lens system being configured to Fourier transform the light to be influenced;
said first phase-modifying array being disposed between said first lens system and said second lens system in said propagation direction of the light to be influenced;
said first phase-modifying array being disposed in or in a vicinity of an output-side Fourier plane of said first lens system and in or in a vicinity of an input-side Fourier plane of said second lens system.

2. The device according to claim 1, wherein an output-side focal plane of said first array of lens systems corresponds to an input-side Fourier plane of said first lens system or is disposed in a vicinity of said input-side Fourier plane of said first lens system.

3. The device according to claim 1, wherein an input-side focal plane of said second array of lens systems corresponds to an output-side Fourier plane of said second lens system or is disposed in a vicinity of said output-side Fourier plane of said second lens system.

4. The device according to claim 1, wherein said first and second lens systems form a telescope or a configuration similar to a telescope.

5. The device according to claim 1, wherein said first and second lens systems form a telecentric system.

6. The device according to claim 1, wherein said first lens system and said second lens system are disposed in such a way that an output-side focal plane of said first lens system and an input-side focal plane of said second lens system correspond to each other or are disposed approximately in the same region.

7. The device according to claim 1, wherein at least one of said first or second lens systems include a multiplicity of lenses.

8. The device according to claim 1, wherein at least one of said first array of lens systems or said second array of lens systems includes a first and a second optically functional interface being spaced apart from each other in said propagation direction of the light to be influenced, with an array of lens elements being formed on each of said interfaces.

9. The device according to claim 8, wherein a spacing between said first and second optically functional interfaces of at least one of said first array of lens systems or said second array of lens systems in said propagation direction of the light to be influenced corresponds to a focal length of said lens elements of at least one of said first or second optically functional interfaces.

10. The device according to claim 8, wherein said lens systems of at least one of said first or second arrays of lens systems are cylinder lens systems, and cylinder axes of said lens elements disposed on said first and second optically functional interfaces of at least one of said first or second arrays of lens systems are aligned mutually perpendicularly or parallel.

11. The device according to claim 8, wherein said lens systems of at least one of said first or second or at least one further arrays of lens systems are cylinder lens systems, and cylinder axes of said lens elements disposed on said first and second optically functional interfaces of at least one of said first array of lens systems or said second array of lens systems or said at least one further array of lens systems are aligned mutually perpendicularly or parallel.

12. The device according to claim 1, which further comprises a second phase-modifying array disposed in a vicinity of or before or after said second array of lens systems in said propagation direction of the light to be influenced.

13. The device according to claim 12, wherein parts of the light to be influenced which pass through different phase modifiers of said second phase-modifying array can experience a different change of their phase from one another in said phase modifiers.

14. The device according to claim 12, wherein parts of the light to be influenced which pass through different phase modifiers of at least one of said first or second phase-modifying array can experience a different change of their phase from one another in said phase modifiers.

15. The device according to claim 12, wherein at least one of said arrays of lens systems or at least one of said arrays of phase modifiers or said lens system are integrated optical components.

16. The device according to claim 12, wherein said phase modifiers of at least one of said arrays of phase modifiers are selected from the group consisting of electro-optical modifiers, acousto-optical modifiers and liquid crystal-based modifiers.

17. The device according to claim 1, wherein parts of the light to be influenced which pass through different phase modifiers of said first phase-modifying array can experience a different change of their phase from one another in said phase modifiers.

18. The device according to claim 1, which further comprises at least one further array of lens systems, through which the light having passed through said second array of lens systems can at least partially pass, said at least one further array of lens systems causing a plurality of local intensity maxima of the light to be influenced to be created in a vicinity of or before said at least one further array of lens systems in the propagation direction of the light to be influenced.

19. The device according to claim 18, which further comprises a further lens system disposed between said second array of lens systems and said at least one further array of lens systems.

20. The device according to claim 19, wherein an output-side focal plane of said lens systems of said second array of lens systems corresponds to or is disposed in a vicinity of an input-side focal plane or Fourier plane of said further lens system.

21. The device according to claim 18, which further comprises at least one further phase-modifying array disposed in a vicinity of or before or after said at least one further array of lens systems in said propagation direction of the light to be influenced.

22. The device according to claim 18, which further comprises a lens system disposed after said at least one further array of lens systems in said propagation direction of the light to be influenced.

23. The device according to claim 18, which further comprises a telescope disposed after said at least one further array of lens systems in said propagation direction of the light to be influenced.

24. The device according to claim 18, wherein said lens systems of at least one of said first or second or at least one further arrays of lens systems are cylinder lens systems.

25. The device according to claim 1, which further comprises a lens system disposed after said second array of lens systems in said propagation direction of the light to be influenced.

26. The device according to claim 1, which further comprises a telescope disposed after said second array of lens systems in said propagation direction of the light to be influenced.

27. The device according to claim 1, wherein said lens systems of at least one of said first or second arrays of lens systems are cylinder lens systems.

28. The device according to claim 1, wherein at least one of said arrays of lens systems or said phase-modifying array or said lens system are integrated optical components.

29. The device according to claim 1, wherein at least one of said arrays of lens systems or said phase-modifying array or at least one of said lens systems are integrated optical components.

30. The device according to claim 1, wherein said lens systems of at least one of said arrays of lens systems are geodesic lens systems.

31. The device according to claim 1, wherein said phase modifiers of said phase-modifying array are selected from the group consisting of electro-optical modifiers, acousto-optical modifiers and liquid crystal-based modifiers.

32. An apparatus for beam deviation, the apparatus comprising the device according to claim 1.

33. A laser television, comprising the device according to claim 1.

34. An apparatus for optical data storage, the apparatus comprising the device according to claim 1.

35. A commutator, comprising the device according to claim 1.

36. A method for influencing light, the method comprising using a device according to claim 1 to carry out the following steps:
   passing the light at least partially through a first array of lens systems;
   passing the light through a first lens system Fourier transforming the light, after passing through the first array of lens systems;
   changing phases, at least in subregions, of the light having passed through individual lens systems of the first array of lens systems and having been Fourier-transformed;
   generating a plurality of local intensity maxima of the light to be influenced before a second array of lens systems in a propagation direction of the light to be influenced; and
   passing the light at least partially through the lens systems of the second array of lens systems.

37. A device for influencing light, the device comprising:
   a first array of individual lens systems, through which the light to be influenced can at least partially pass;
   a first phase-modifying array for modifying phases of the light having passed through said individual lens systems of said first array of lens systems;
   a second array of lens systems, through which the light having passed through said first phase-modifying array can at least partially pass, said second array of lens systems causing a plurality of local intensity maxima of the light to be influenced to be created in a vicinity of or before said second array of lens systems in a propagation direction of the light to be influenced;
   a first lens system disposed between said first array of lens systems and said second array of lens systems;
   said first phase-modifying array being disposed after said first lens system in said propagation direction of the light to be influenced;
   at least one of said first array of lens systems or said second array of lens systems including a first and a second optically functional interface being spaced apart from each other in said propagation direction of the light to be influenced, with a array of lens elements being formed on each of said interfaces; and
   said first phase-modifying array being disposed between said two optically functional interfaces of said first array of lens systems in said propagation direction of the light to be influenced.

38. A device for influencing light, the device comprising:
   a first array of individual lens systems, through which the light to be influenced can at least partially pass;
   a first phase-modifying array for modifying phases of the light having passed through said individual lens systems of said first array of lens systems;
   a second array of lens systems, through which the light having passed through said first phase-modifying array can at least partially pass, said second array of lens systems causing a plurality of local intensity maxima of the light to be influenced to be created in a vicinity of or before said second array of lens systems in a propagation direction of the light to be influenced;
   a first lens system disposed between said first array of lens systems and said second array of lens systems;
   said first phase-modifying array being disposed after said first lens system in said propagation direction of the light to be influenced;
   at least one of said first array of lens systems or said second array of lens systems including a first and a second optically functional interface being spaced apart from each other in said propagation direction of the light to be influenced, with an array of lens elements being formed on each of said interfaces; and
   a second phase-modifying array disposed in a vicinity of or before or after said second array of lens systems in said propagation direction of the light to be influenced, said second phase-modifying array being disposed between said two optically functional interfaces of said second array of lens systems in said propagation direction of the light to be influenced.

39. A device for influencing light, the device comprising:
   a first array of individual lens systems, through which the light to be influenced can at least partially pass;
   a first phase-modifying array for modifying phases of the light having passed through said individual lens systems of said first array of lens systems;
   a second array of lens systems, through which the light having passed through said first phase-modifying array can at least partially pass, said second array of lens systems causing a plurality of local intensity maxima of the light to be influenced to be created in a vicinity of or before said second array of lens systems in a propagation direction of the light to be influenced;
   a first lens system disposed between said first array of lens systems and said second array of lens systems;
   said first phase-modifying array being disposed after said first lens system in said propagation direction of the light to be influenced;
   at least one of said first array of lens systems or said second array of lens systems including a first and a second optically functional interface being spaced apart from each other in said propagation direction of the light to be influenced, with an array of lens elements being formed on each of said interfaces; and
   a second phase-modifying array disposed in a vicinity of or before or after said second array of lens systems in said propagation direction of the light to be influenced, said first phase-modifying array being disposed between said two optically functional interfaces of said first array of lens systems in said propagation direction of the light to be influenced, and said second phase-modifying array being disposed between said two optically functional interfaces of said second array of lens systems in said propagation direction of the light to be influenced.

40. A device for influencing light, the device comprising:
   a first array of individual lens systems, through which the light to be influenced can at least partially pass;
   a first phase-modifying array for modifying phases of the light having passed through said individual lens systems of said first array of lens systems;
   a second array of lens systems, through which the light having passed through said first phase-modifying array can at least partially pass, said second array of lens systems causing a plurality of local intensity maxima of the light to be influenced to be created in a vicinity of or before said second array of lens systems in a propagation direction of the light to be influenced;
   a first lens system disposed between said first array of lens systems and said second array of lens systems; and
   at least one further array of lens systems, through which the light having passed through said second array of lens systems can at least partially pass, said at least one further array of lens systems causing a plurality of local intensity maxima of the light to be influenced to be created in a vicinity of or before said at least one further array of lens systems in the propagation direction of the light to be influenced.

41. The device according to claim 40, wherein said lens systems of at least one of said first or second or at least one further arrays of lens systems are cylinder lens systems.

* * * * *